United States Patent [19]

Hendrickson

[11] 4,220,994
[45] Sep. 2, 1980

[54] GENERAL PURPOSE NAVIGATION AID DEVICE

[75] Inventor: Alvin E. Hendrickson, Chula Vista, Calif.

[73] Assignee: Eldon W. Planalp, San Diego, Calif.

[21] Appl. No.: 928,635

[22] Filed: Jul. 27, 1978

[51] Int. Cl.³ .................... G06F 15/50; G01S 7/04
[52] U.S. Cl. ................... 364/450; 340/27 NA;
343/112 C; 343/112 PT; 364/444
[58] Field of Search ............. 364/424, 443, 444, 449,
364/450, 451, 445, 460, 400, 200 MS File, 900
MS File; 358/103, 903; 343/112 C, 112 PT;
340/27 NA, 24

[56] References Cited

U.S. PATENT DOCUMENTS

| | | | |
|---|---|---|---|
| 3,701,945 | 10/1972 | Gallant et al. | 364/451 X |
| 3,786,505 | 1/1974 | Rennie | 364/450 X |
| 3,967,098 | 6/1976 | Harnagel | 364/443 |
| 4,071,895 | 1/1978 | Wood et al. | 364/449 |
| 4,086,632 | 4/1978 | Lions | 364/444 |

*Primary Examiner*—Joseph F. Ruggiero
*Attorney, Agent, or Firm*—Henri J. A. Charmasson

[57] ABSTRACT

A device for assisting a pilot in the navigation of a small aircraft which comprises a micro processor with a keyboard input device, a cathode ray tube as output and a mini-disc memory. The device is housed in a portable package which can be installed in the control panel of the aircraft.

The data base comprises most of the information usually derived from a sectional aeronautical chart for the preparation of a flight plan, including location coordinates of airports and V.O.R. stations, transmitting frequencies and runways characteristics. The program library comprises dialectical routines for guiding the pilot through the preparation of flight plans, and the resolution of common navigational problems such as dead reckoning, wind effect, bearing correction, fuel consumption and range determination.

3 Claims, 14 Drawing Figures

LOL

$$b = [\,l_A - l_B\,]$$
$$a = [\,L_B - L_A\,]\cos l_B$$
$$\cos c = \cos a \cdot \cos b$$
$$\sin X = \frac{\sin a}{\sin c}$$
$$\sin Y = \frac{\sin b}{\sin c}$$

ASA

SAS

SSA

SSS

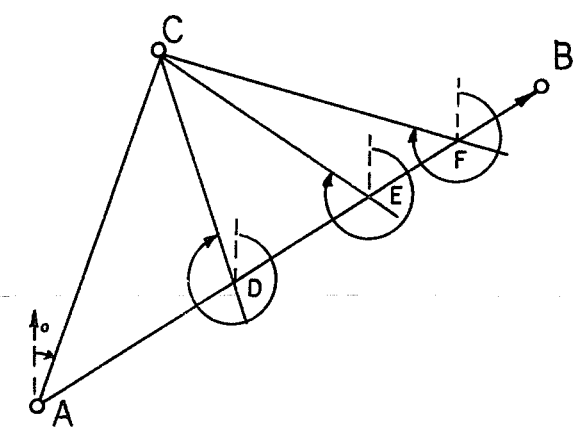
FIG. 12
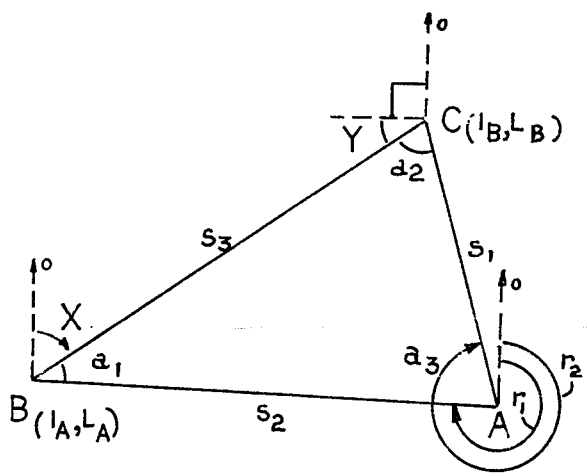
FIG. 13
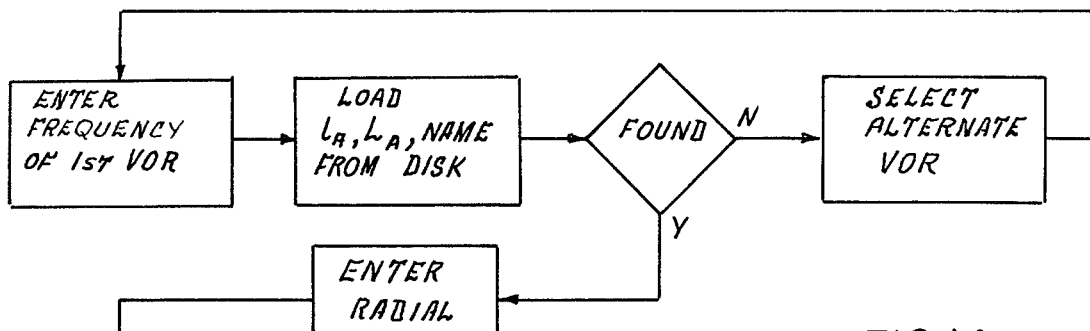
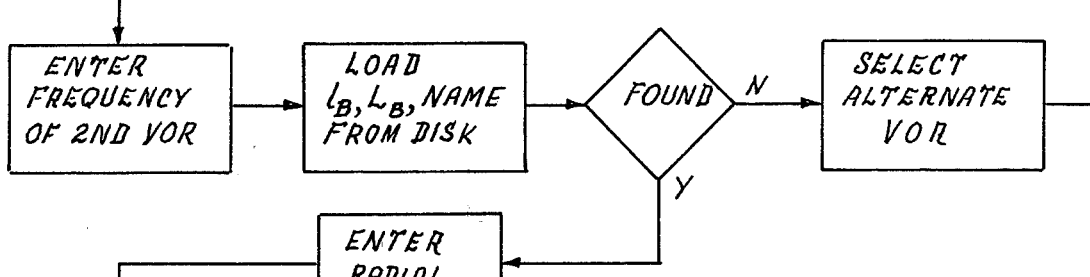
FIG. 14
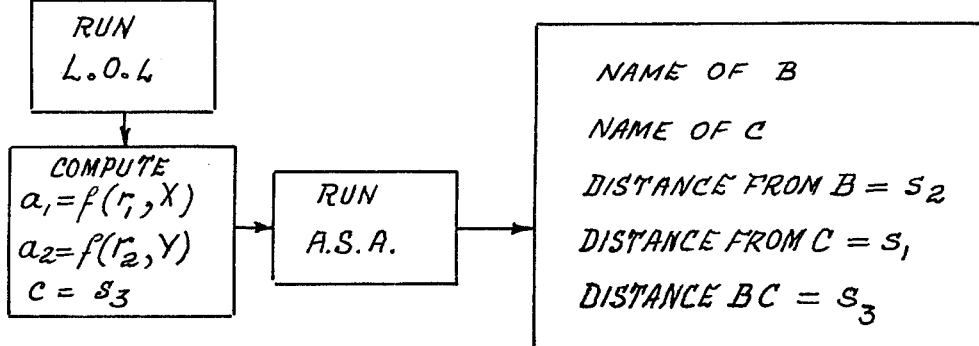

GENERAL PURPOSE NAVIGATION AID DEVICE

BACKGROUND OF THE INVENTION

The pilot of a small aircraft who is about to embark on a flight between two airports must prepare a flight plan, file it with, and obtain the approval of the air traffic control authorities.

The preparation of the flight plan requires the plotting of the aircraft itinerary on a map (sectional chart) and the computation of heading, flight time, fuel range by means of a slide-rule type device also known as an "aviation computer" and a protractor-and-ruler combination known as a plotter.

The scales on the ruler are calibrated in miles to correspond to the scale of the sectional chart. With this instrument the pilot draws the course line connecting his point of departure with his destination, read the direction of the course by means of the protractor, and determine the distance by referring to the appropriate miles scale.

The aviation computer provides for the solving of various types of navigation problems. One side is used to determine the effect of the wind on the course and ground speed of the aircraft, and the other side is used as a circular slide rule. The inner disk of the slide rule, which is movable, is usually taken to represent minutes and hours of time, and the numbers on the other scale indicate miles and gallons of fuel.

In practice, the pilot determines how long it takes him to cover the distance between two landmarks on his chart. He then sets this time on the inner disk of his computer in line with the distance between the landmarks. Opposite 60 minutes on the inside scale he can read the number of miles per hour he is making on the outer scale. He can also determine how far he will go in a given length of time, or he can read the length of time it will take him to travel any desired distance. Provision is also made for calculating the true air speed at any altitude, and for determining the true altitude when the temperature is known.

Once the aircraft is airborne one of the most important tasks of the pilot is to periodically determine its exact location (dead reckoning). This can be accomplished by visual identification of topographical landmarks indicated on the area sectional chart. Most small aircraft are now equipped with VOR receivers which allow not only for the determination of the distinctive transmitting frequency of the station but also the angular position of the aircraft in relation to the station. The two angular positions can be used by the pilot to pinpoint the exact location of the aircraft on the sectional chart. If the distance between two detectable stations is known to the pilot, he can by simple triangulation method determine the distance of the aircraft from each of said stations.

If the pilot finds that the aircraft has deviated from the planned itinerary, or that he is running behind schedule, it may be necessary to determine the wind drift experienced by the aircraft and to compute a corrective heading which will keep the aircraft on its planned route. The aircraft fuel consumption, time of arrival and range should also be recalculated in function of the newly discovered conditions. The flight computer is again used in coordination with the sectional chart to perform these calculations.

The distance between two points on the surface of the earth which is computed through use of plane geometry fails to take into account the sphericity of the earth globe. The formula which ascribes a number of statute miles to each degree is not absolute and varies with latitude and longitude. One must thus refer to published tables which give the true distance between selected points, taking into account the local spherical distortions of the earth. The use and interpretation of these tables further complicates the flight planning and navigational tasks of the pilot.

The various tasks described above are tedious, time consuming and distract the pilot's attention from the regular piloting of the aircraft. The reading of a chart and the plotting of tracks thereupon are not easily done by the pilot while he is at the controls of the aircraft.

SUMMARY OF THE INVENTION

The present invention offers an electronic means for assisting the pilot of a small aircraft in performing the preflight and in-flight navigational planning and computations.

It teaches the use of a general purpose micro data processor complemented by a mini-disc memory for storing the data base. A customized keyboard is used to access the processor. A cathode-ray-tube (C.R.T.) is featured as the output unit. The processor can also be accessed by means of a light beam pencil applied to the C.R.T. display surface. This access is effected by touching the images of keys selectively displayed on the C.R.T. with the light pencil. This feature allows for the use of the system in total darkness. The instrumentation is packaged for mounting in the control panel of the aircraft. The processor and auxiliary disc-memory are based in a portable package that can be removed from the cockpit and used in the ground, in connection with a standard television receiver for output display.

The data base comprises most of the flight information normally derived from a sectional aeronautical chart. The program library comprises a routine for the calculation of flying distances between ground locations, taking into account the distortion in the sphericity of the earth. Other routines are provided to resolve dead-reckoning problems through triangulation; wind effect and corrective bearing calculations through vectorial analysis; and automatic computation of fuel consumption, flying time and flying range.

The system capability can easily be expanded by addition of program routines for determining the true altitude and take off speed in function of pressure and temperature; for monitoring the airplane and engine functions, and for automatically triggering alarm warning the pilot when dangerous conditions such as loss of altitude, stalling conditions and engine overload occur.

Where and when permissible, the invention contemplates the installation on-board the aircraft of a receiver tuned to the frequency used for transmitting air traffic radar image between the radar station and the airport traffic control tower. The image reconstituted through the processor is displayed on the C.R.T. The receiver detects the aircraft locating signal so that the pilot may identify on the display its own position in the radar image.

The main purposes of the invention are to provide the pilot with:
an automatic question-and-answer device for the preparation of a flight plan;
a comprehensive source of quickly retrievable reference data for the area to be travelled;

an automatic means for performing all the routine navigational computations;

a continuous monitoring of the aircraft track, fuel consumption and schedule;

an automatic dialectical means for performing dead-reckoning and measurement of distances from or to any point; and, a comprehensive navigational apparatus which can be simply and quickly operated in very low ambient light.

IN THE DRAWING

FIG. 12 is the diagrammatical illustration of checkpoints selection along the aircraft itinerary;

FIG. 13 is the diagrammatical illustration of dead-reckoning by means of two VOR stations; and FIG. 14 is the flow diagram of the routine used for dead-reckoning.

DESCRIPTION OF THE PREFERRED EMBODIMENT OF THE INVENTION

Figure 1:
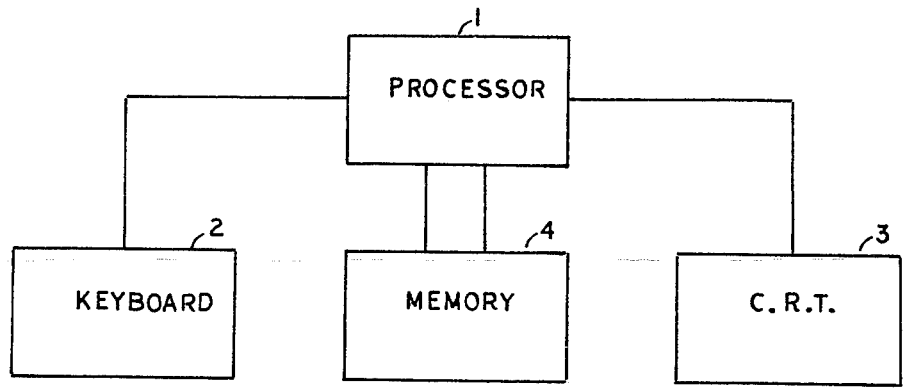
FIG. 1 is a block diagram showing the basic elements of the apparatus.

Referring now to the drawing, there is shown in FIG. 1 the block diagram of an apparatus embodying the present invention. The processor 1, is an electronic device incorporating a micro-processor circuit and associated circuits for controlling peripheral units. The peripheral units are a keyboard 2 used to enter data into the apparatus, a storage memory 4 and a cathode-ray-tube (C.R.T.) used for displaying the data output from the processor.

Figure 2:
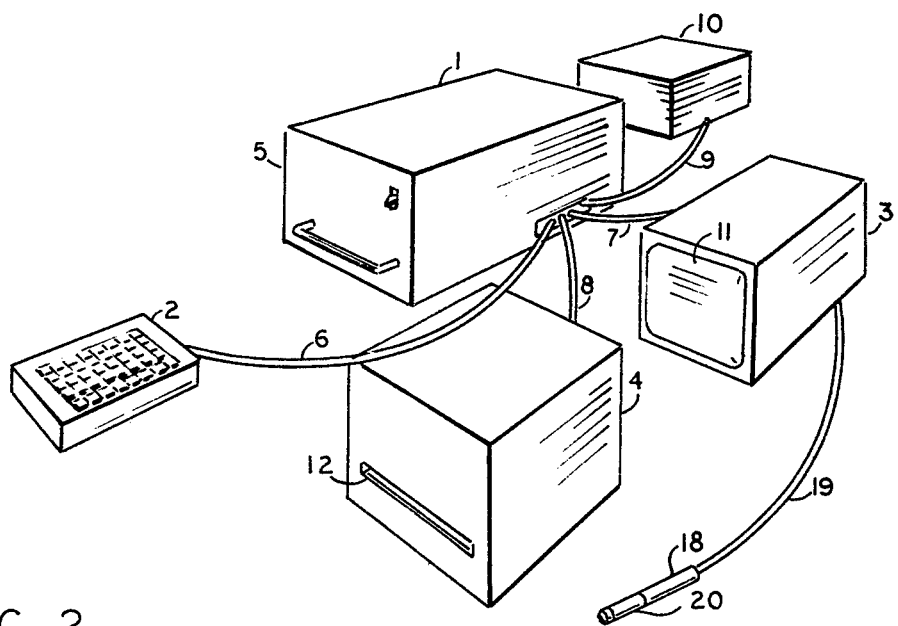
FIG. 2 is a perspective view of the various packages housing the basic elements of the apparatus.

FIG. 2 is an illustration of the four packages housing the various components of the apparatus.

The processor 1 is built around a Model 8085 micro-computer system manufactured by INTEL. It is wired to accept the computer programing language known as BASIC-PLUS(BASICP). The structure of the processor is similar to that of an IMSAI Model PCS 80/30 micro-computer manufactured by IMSAI Manufacturing Corporation and described in the IMSAI PCS 80/30 Microcomputer System Manual. It is packaged in a portable case 5 which can be carried on-board a small aircraft.

A series of cables 6,7, 8 and 9 connects the processor 1 to the peripheral units.

Cable 6 leads to the keyboard 2 which can be used unsecured as a hand held unit, or mounted on the instrument panel of the aircraft.

The keyboard 2 generates an 8 bit coded information for each key or combination of keys depressed. The keyboard is similar to the Model IKB 1 manufactured by IMSAI is used in conjunction with Model PCS 8/30 micro-computer.

The processor is tied to the C.R.T. 3 by cable 7. The C.R.T. is mounted on the instrument panel or in any convenient location in the cockpit of the aircraft. The face 11 of the C.R.T. occupies not more than twenty square inches. (Fifty square centimeters) of panel space. The internal circuitry of the C.R.T. 3 and its operation are similar to those the C.R.T. used in the MSAI Model PCS 80/30 and described in the MSAI Model PCS 80/30 Micro-computer System Manual.

A third cable 8 connects the processor 1 to a floppy disk memory unit 4 similar to Model SA400 manufactured by SHUGART ASSOCIATES, and described in the SHUGART Model SA400 Operator Manual. The memory Unit 4 is also secured in a convenient area of the cockpit.

The processor 1, keyboard 2 and memory unit 4 can be easily removed from the cockpit and used outside the aircraft in association with a standard television receiver in place of the C.R.T. Unit 3.

The processor is connected by Cable 9 to a power inverter 10 which supplies the necessary AC voltage to the various components of the system. The inverter 10 is fed by a DC voltage from the aircraft batteries.

There is recorded on a disk 12 of the memory unit 4 information derived from at least one of the seventeen sectional aeronautical charts covering the continental United States. The information comprises data pertaining to each airport and to each VHF OMNI range (VOR) station located in the area covered by each sectional map.

For each airport there is stored the elevation, the length of its largest runway, its longitude, its latitude, the radio frequency for ground and tower control and the radials from two nearby VOR stations as well as the distance from these two stations. For each VOR station there is stored its frequency latitude, longitude and mnemonic code of the station.

The above-listed information constitutes the basic data base of the system. This data base can be exploited by means of various program routines designed to resolve navigational problems encountered by the pilot of small aircrafts.

The program library comprises nine basic subroutines, which are stored on the disk 12.

The operator is guided through each routine by a dialectical loop which involves questions and answers between the processor and the operator. Questions may be asked or answered by the apparatus via the C.R.T. or by the operator via the keyboard.

Figure 4:
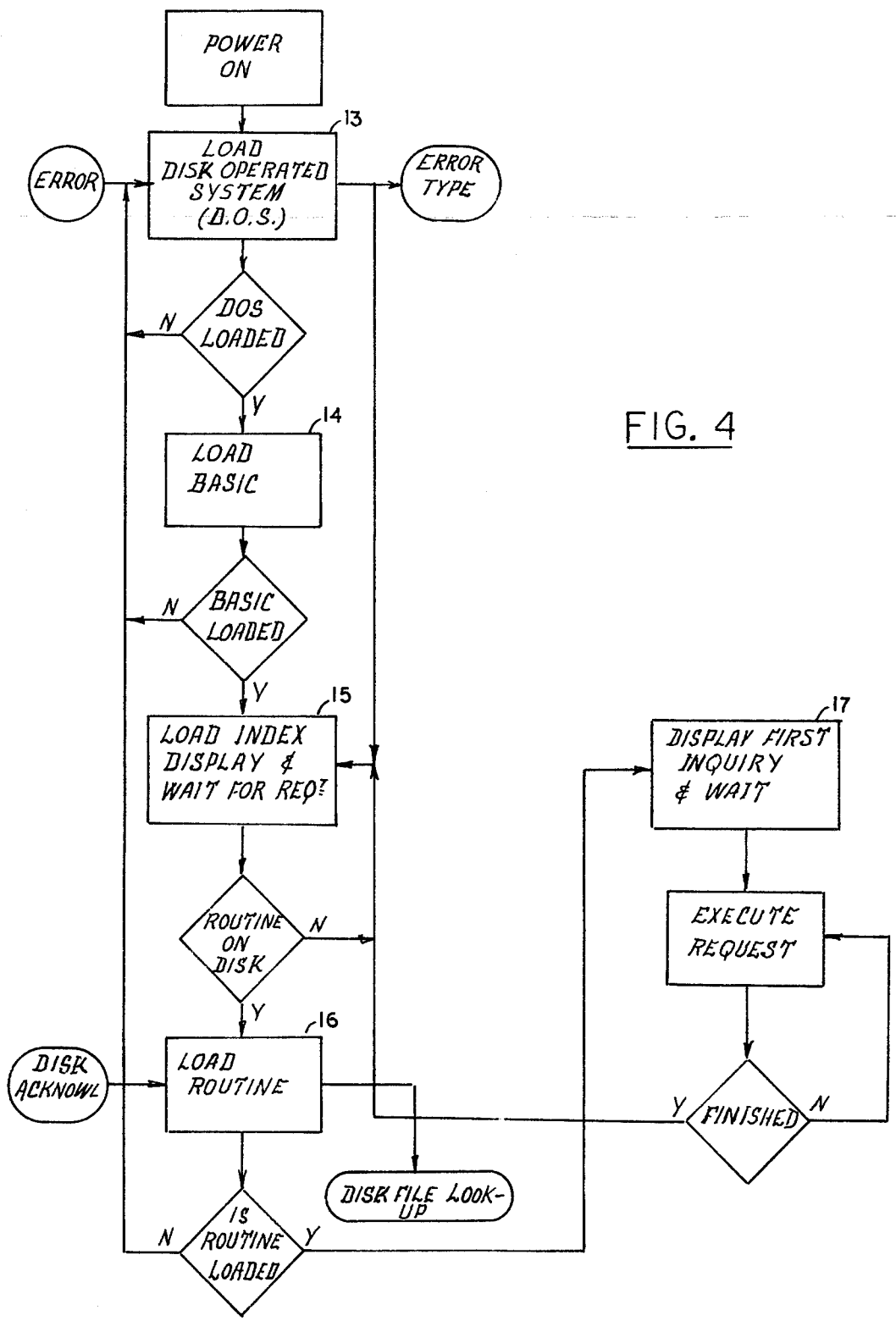
FIG. 4 is a flow diagram of the general program.

FIG. 4 is a flow diagram of the general program.

After the apparatus is powered up, the Disc Operated System (DOS) program is loaded 13 from the disk memory 4 into the processor 1. This is followed by the loading 14 of the basic language program. The index list which list the various routines recorded on the disk memory 4 is then loaded 15 into the processor 1. The index list is immediately displayed on the C.R.T. 3. The system then waits for the operator to make his selection of the routine wanted by keying one of the numbers displayed next to the routines names. In this preferred embodiment the routines are listed as follows:

1: Airport directory sectional charts
2: Locator using two omni bearings
3: Navigational distance omni to omni
4: Course calculator ASA-SSA-SSS-SSA 5: Time-Fuel-Range
6: Distance and heading airport to airport
7: Ground speed and distance to destination
8: Flight plan
9: Wind triangle Upon operator's selection of a routine, the corresponding program is loaded 16 from the memory 4—and the execution of the routine begins with the display 17 on the CRT 3 of the first inquiry by the processor. At the end of the routine program the index is again loaded and displayed 15. The system is now ready to proceed with the next routine.

If the operator selects routine no. 1 labelled: "Airport Directory Sectional Chart," the system causes to be displayed on the CRT a list of the thirty-seven sectional aeronautical charts covering the continental United States, published by the U.S. Department of Commerce. The operator is invited to select one of the charts by keying one of the thirty-seven identification numbers assigned to the charts.

In response to the keying of a chart number, a list of airports covered by the selected chart is fetched from the memory 4 and displayed on the C.R.T. 3. The operator is then invited to select by number one of the airports listed.

Upon selection of a particular airport, the information stored in the data base pertaining to it is fetched from the memory and displayed on the C.R.T.

Assuming that the LOS ANGELES sectional chart has been selected and that LINDGERGH FIELD in SAN DIEGO, California, has been singled out, the following information will appear on the C.R.T. 3:

LINDGERGH FIELD: ELEV. 15' Longst Rway 9400'117:11-32:44
TPA: 1200' LGHT 1200' MSL 2000' HVY 2000' MSL
VOR FREQ. RAD NM TWR GRD ATIS
MZB 117.8 128 3 133.1 121.7 132.35
JLI 114.0 216 39 118.3 121.7 132.35

On the first line, following the name of the airport are its elevation in feet, length of longest runway, longitude and latitude (in degrees and decimals). On the second line are listed the traffic pattern approach altitude TPA for Light aircrafts (LGHT), the mean sea level connection (MSL) and the same information for heavy aircrafts (HVY).

On the third and fourth lines there first appears information pertaining to the two local V.H.F. OMNI-RANGE (VOR) stations, in this case, MISSION BAY (MZB) and JULIAN (JLI). For each station there is given its frequency (FREQ), its radial bearing (RB) to the airport, and its distance (NM) in nautical miles.

There follows the airport tower frequencies (TWR) the ground frequency (GRND) and lastly, the Automatic Terminal Information Service (ATIS) frequency.

This type of information may be obtained by the operator following the above-described procedure for any other airport which has been documented in the data base.

The concentration of the data base information on a disk allows for a simple and rapid updating of the data on line either on site or at a service center or manufacturer's facility.

Returning to FIG. 2, there is illustrated a supply cable 19 connecting the CRT 3 to a light beam pencil 18. The technique of making a CRT sensitive to a light beam applied to its face is not new and well known to the people skilled in the electric arts. The presence of a light spot on the CRT display surface may be detected on the accelerating anodes in the form of leakage current variation as the CRT beam sweeps over the light spot. By coordinating in the control circuit of the system the CRT beam location and the detection of the light spot it is possible to make intelligent entries into the system by means of a light beam pencil. Answers by the operator to inquiries by the system can be effected with the light beam pencil. In this embodiment of the invention the pencil 18 which comprises a light bulb and colimating lens 20 receives its power from the CRT power supply through cable 19.

The use of the light beam pencil in place of the keyboard is particularly useful to a pilot operating in total darkness.

Figure 3:
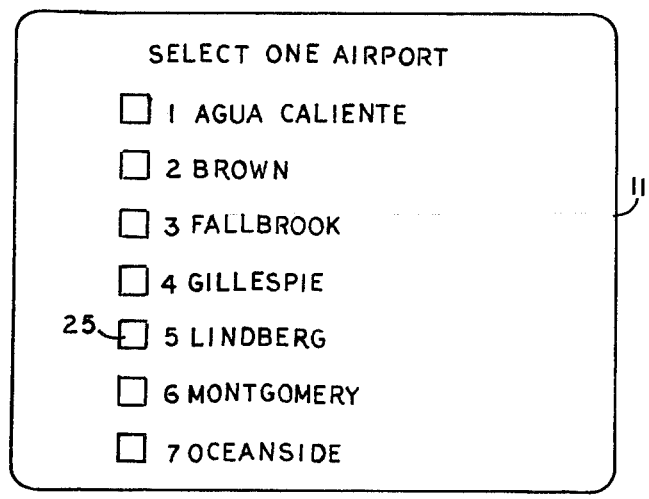
FIG. 3 is an illustration of an inquiry display on the screen of the cathode-ray-tube.

FIG. 3 illustrates a typical system inquiry format as it may appear on the CRT screen 11.

If the pilot wants to select LINDGERGH airport he only has to apply the light pencil to the check spot 25 adjacent to the word "LINDBERGH."

Figure 5:
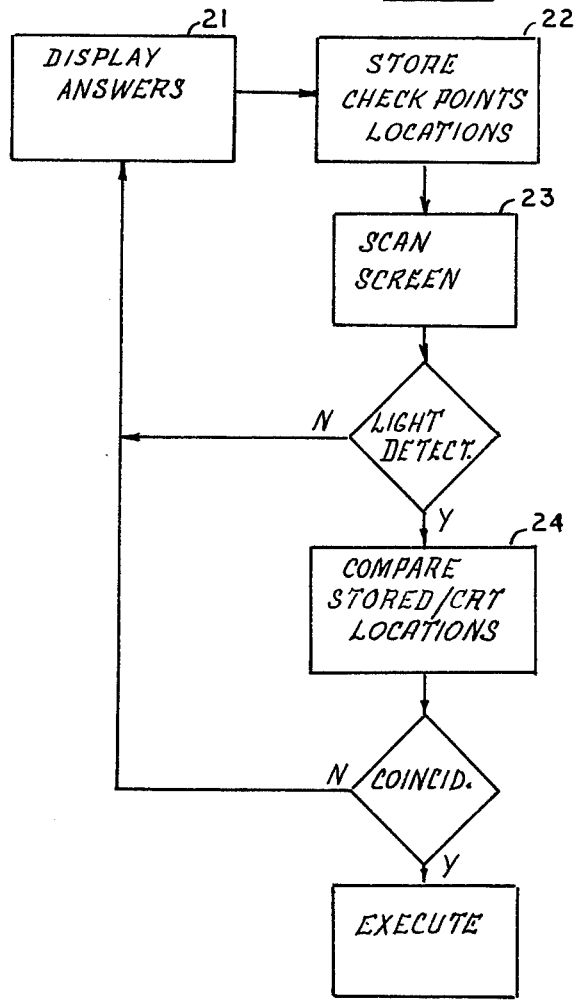
FIG. 5 is the flow diagram of a light pencil inquiry subroutine.

FIG. 5 is the flow diagram of a subroutine which is to be included in block 15 and 17 of FIG. 4, in order to allow for the use of the light pencil.

After displaying the inquiry and possible answers 21, the system stores in a register the location XY coordinates of each check spot such as 25. If a light spot is detected during the next CRT scan 23 the CRT beam XY coordinates are compared to the XY coordinates stored in the register. When a coincidence occurs the subroutine corresponding to the selected answer is executed.

In the present embodiment of the invention the CRT 3 may also be used to display during flights a local radar image. In major airports the air traffic control radar is frequently located in the proximity of the airport, usually on a promontory. The radar signal is processed at the radar station and sent, as a image signal, via communication channel to the airport control tower. There, the signal is displayed on a radar screen.

Figure 6:
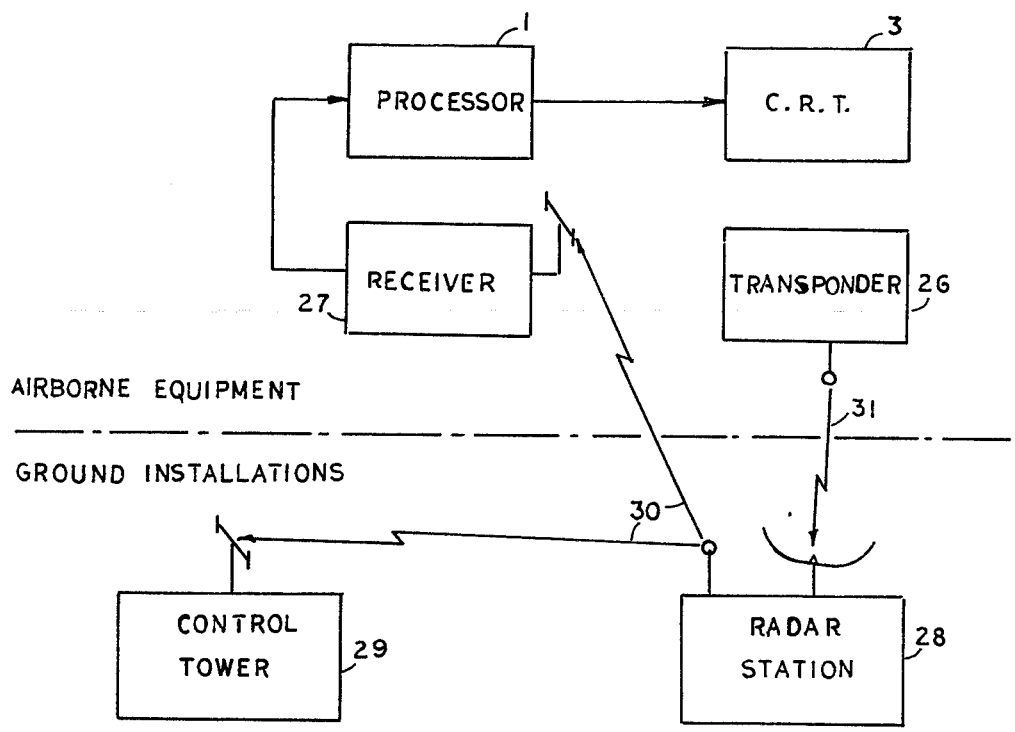
FIG. 6 is a block diagram of the radar image display system.

FIG. 6 is the block diagram of a system which allows for the reception of the radar image signal 30 by the aircraft and its display on the CRT 3.

A receiver 27 must be installed on the aircraft and be tuned to the radio frequency used by the radar station 28 for transmitting to the control tower 29 the radar image signal 30.

The receiver must also be able to detect the aircraft identification signal issued by the aircraft transponder 31. The transponder identification beacon signal of an aircraft is detected by the radar station and sent in synchronization with the radar image signal 30 to the traffic tower 29. There the identification signal can be displayed in the screen to identify the radio echo created by that particular aircraft.

Figure 7:
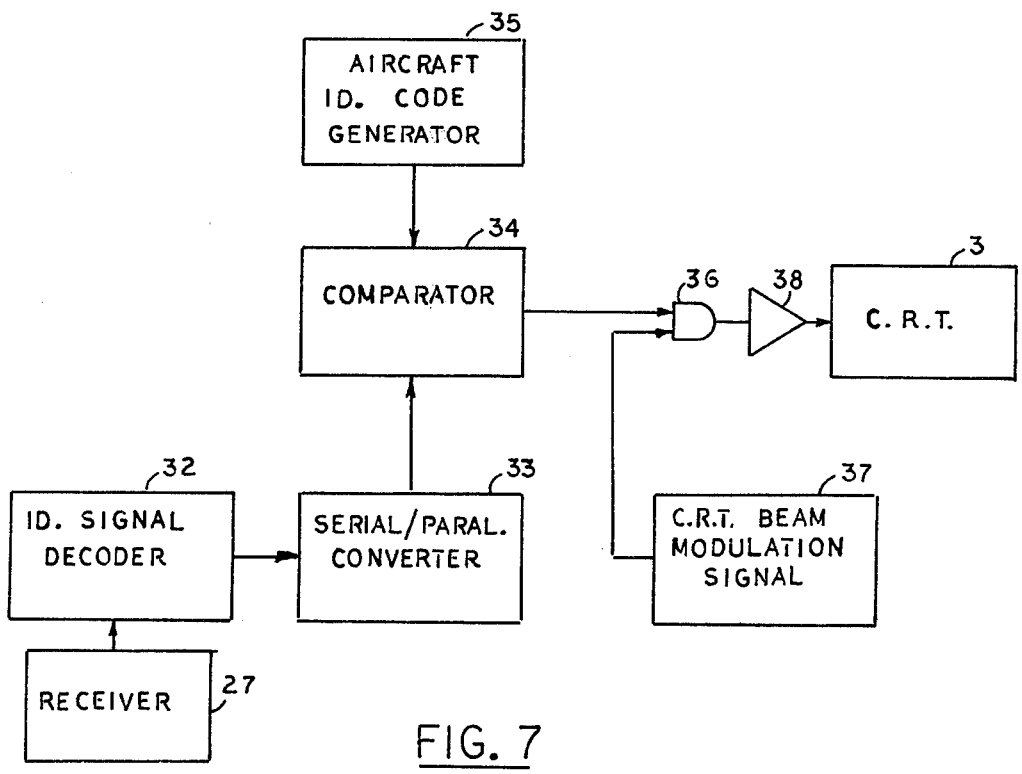
FIG. 7 is a block diagram of the aircraft self-identification circuit.

In this particular embodiment of the invention, the CRT control logic section of the processor 1 is equipped with an aircraft self-identification circuit operating according to the block diagram shown in FIG. 7.

The planes identification codes are separated from the radar image signal at the output of the receiver 27 by an identification signal decoder 32. The identification signal is then converted from a bit-serial to bit-parallel form by converter 33 and applied to a coincidence comparator 34. The comparator uses for reference the identification code of the aircraft transmitted by its transponder. This code is hard-wired or dialed by means of switches in the aircraft identification code generator 35. When coincidence of codes occurs between the two inputs to the comparator 34, gate 36 is enabled and a CRT beam modulator signal 37 is allowed through the gate 36. The resulting signal is run through amplifier 38 then applied to the CRT 3 to enhance the display of the aircraft's own echo signal.

Figure 8:
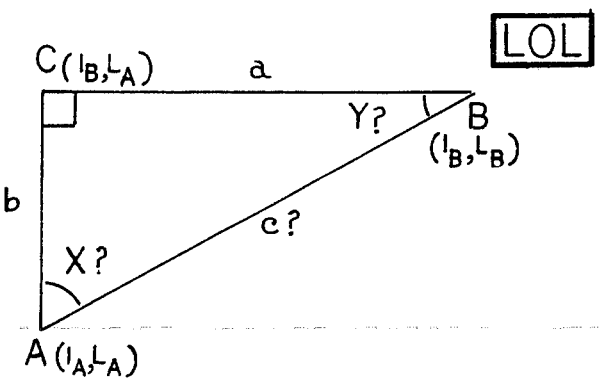
FIG. 8 illustrates the basic mathematical problems resolved by the program mathematical subroutines.
Figure 8:
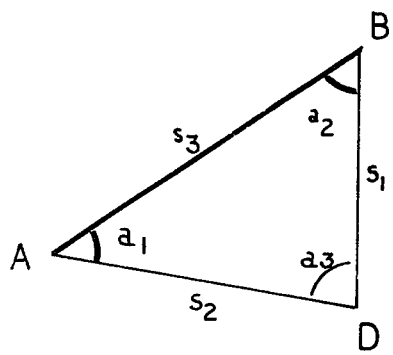
Figure 8:
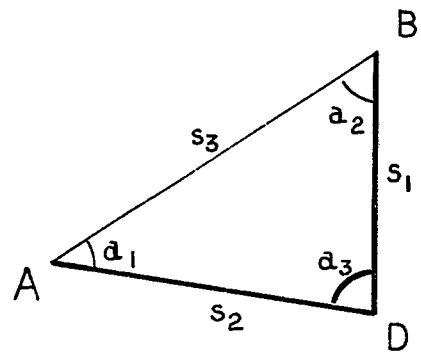
Figure 8:
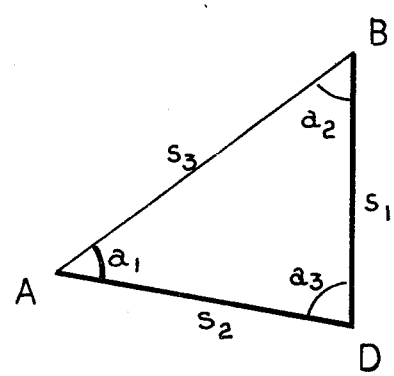
Figure 8:
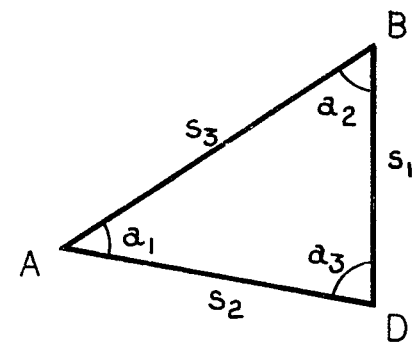

The system program library comprises mathematical subroutines called LOL, ASA, SAS, and SSS. FIG. 8 illustrates the five basic mathematical problems resolved by means of these subroutines as listed below.

LOL: In the right spherical triangle ABC, computation of side angle c and angles X and Y; given the latitude $1_A$ and longitude $L_A$ of point A and latitude $1_B$ and longitude $L_B$ of point B. The applicable formulae are listed in the right-hand column.

ASA: In the plane oblique triangle BCD, computation of the lengths of sides $s_1$ and $s_2$; given angles $a_1$, $a_2$ and the length of side $s_3$.

SAS: In the plane oblique triangle BCD, computation of the length of side $s_3$ and angles $a_1$ $a_2$; given the angle $a_3$ and the length of sides $s_1$ and $s_2$.

In the plane oblique triangle BCD computation of length of side $s_3$ and angles $a_2$, $a_3$; given the length of sides $s_1$, $s_2$ and angle $a_1$.

SSS: In the plane oblique triangle BCD computation of angle $a_1$, $a_2$, and $a_3$; given the lengths of sides $s_1$, $s_2$ and $s_3$.

The five mathematical subroutines just described are used in the system to resolve most navigational problems encountered by the pilot of a small aircraft as explained below.

In the preparation of a flight plan the pilot, as previously described, can obtain detailed information about the destination airport, the departure airport and any other airport on his itinerary. The next step is the determination of distances and headings between these airports.

Figure 9:
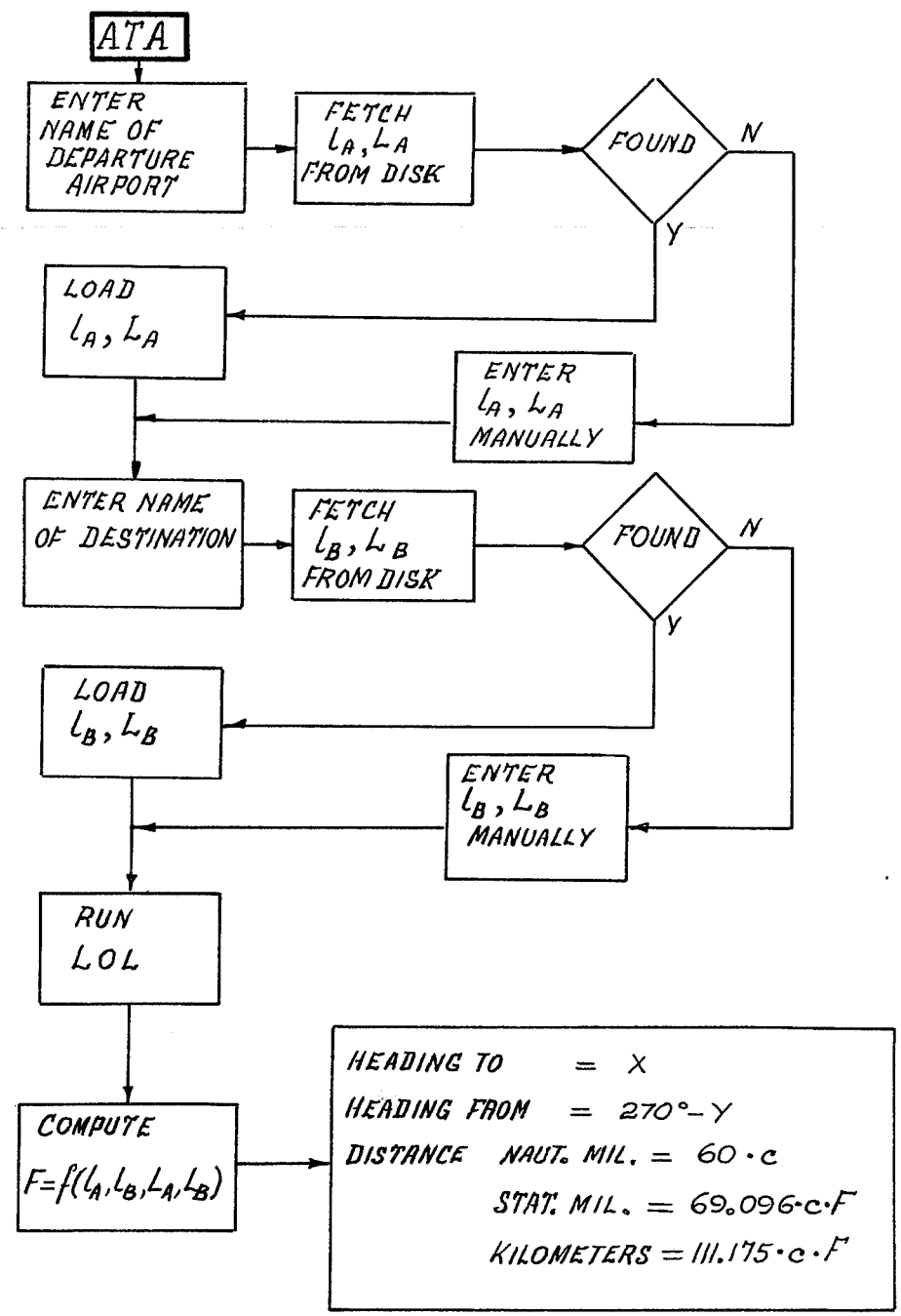
FIG. 9 is a flow diagram of program routine ATA.

FIG. 9 is a flow diagram of program routine (number six in the routine index) called "Distance and heading airport to airport" (ATA), showing how this operation is done using the LOL subroutine.

The program system extracts the latitude and longitude of each airport from the data base. If the data cannot be found on disk, the system will request entry of the data through the keyboard.

The factor F introduces a correction for the variation in the earth radius. In this particular embodiment of the invention four different values of F are used corresponding to the fourth quadrants of the northern hemisphere.

The routine just described is also followed in computing navigational distance between the VOR stations (routine number three in the program index). The VOR stations are identified in the program by their frequencies and by their official nmemonics.

The computation of ground speed and compass heading in function of desired course and the aircraft air speed, wind speed and wind direction may be achieved using the wind triangle routines, WTR (routine number on the program index).

The computation of wind velocity and wind direction in function of true course, true heading and true airspeed may also be resolved through the WTR routine.

Figure 10:
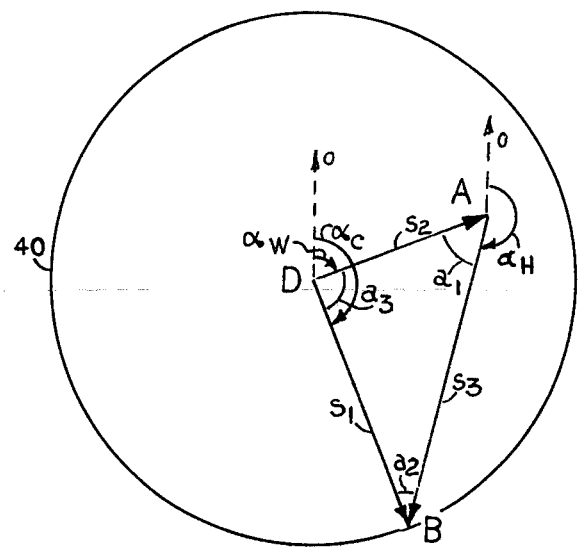
FIG. 10 is the diagrammatical illustration of a wind triangle problem.

Referring now to FIG. 10 let us consider the wind triangle ABD. The air speed circle 40 has a radius $s_1$ equal to the aircraft air speed. Vector DA has a direction $\alpha_W$ equal to the wind direction and a magnitude $s_2$ equal to the wind velocity. Vector AB has a direction $\alpha_H$ equal to the desired or true heading and a magnitude equal to the aircraft true ground speed.

Vector DB has a direction $\alpha_A$ equal to the aircraft compass heading and a magnitude $s_1$ equal to the craft air speed.

Figure 11:
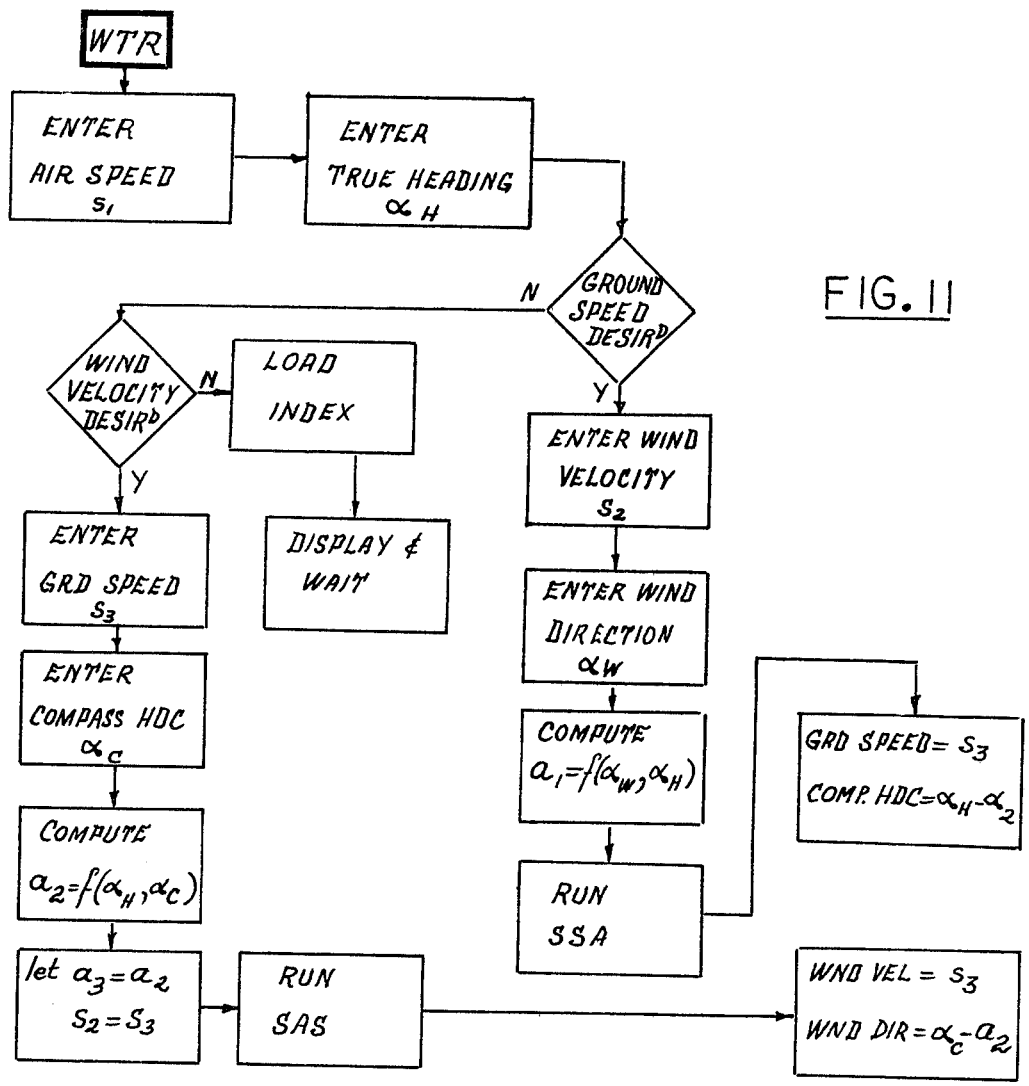
FIG. 11 is the flow diagram of the WTR routine.

FIG. 11 shows how in the WTR routine the resolution of both wind triangle problems is reduced to a simple triangulation based on the LOL and SSA subroutines.

Having determined his plane heading, air speed, and the distance to the destination the pilot must now compute the fuel requirement, flying time and the flying range of the aircraft. The system provides a simple routine (number five on the program index) which calls for manual entry of the distance, the ground speed, the fuel consumption and the fuel reserve and displays in return the flying time, the fuel requirement and the total flying range.

The system also provides a means for checking the performance of the aircraft along its itinerary by selection of a series of check points along the way.

By turning the aircraft VOR receiver to the frequency of a station which has radials perpendicular or near perpendicular to the plane track a series of checkpoints may be defined as illustrated in FIG. 12.

Assuming that the aircraft is travelling from airport A to airport B, and C being the selected VOR stations, check points D,E, and F can be easily defined by triangulation.

A routine (number seven the program index) provides for the computation of the distance between A and C via routine ATA then compute AD, AE and AF by means of subroutine ASA.

The pilot needs only enter the coordinates of points A,B, and C and the direction of the radials CD, CE or CF. The system in return displays the distances AD, AE or AF. If the flight time since departure from airport A is also entered the actual ground speed of the aircraft will be displayed.

A general flight plan routine (number 8 on the program index) allows for the entry of all the flight data which have been computed prior to departure and for automatic update of all parameters in flight as circumstance dictate or in response to the entry of an updated parameter.

In flight the pilot can always verify its position by entering into the system the frequencies and radials ($s_1$, $s_2$) of any two VOR stations. As illustrated in FIG. 13 and 14, the "Locator routine" (number 2 on the program index) identifies the station and computes the distance from the aircraft to each station.

The pilot has also direct access to the ASA, SAS, SSA and SSS subroutines through the routine called "Course calculator" (number four in the program index). Upon request of any one of these subroutines a triangle is displayed on the $CRT_3$ with each angle and each side labelled as shown in FIG. 8. The pilot is then asked to assign values to the given parameters. The system in return displays the values of the unknown parameters.

The program routines and subroutines described above can be easily implemented by persons skilled in the data processing arts and having at their disposals the commercially available hardware listed above, enhanced by the specified data base, the applicable operator manuals, a BASIC-PLUS programming language guide and this Specification.

Other program routines may also be devised and modifications made to the above-described preferred embodiment of this invention without departing from the scope of the appended claims.

I claim:

1. A method for assisting a pilot in the navigation of an aircraft which comprises:

compiling in a data processing apparatus a data base comprising the names, latitudes and longitudes of a plurality of airports located with the area travelled by the aircraft; and the name, frequencies latitudes and longitudes of a plurality of VOR stations detectable within said area;

by means of said data processing apparatus, indexing said data base whereby the information compiled therein for each said airport can be retrieved by calling said airport name, and the information compiled therein for each said station can be retrieved by calling said station name or said station frequency, computing as needed the distance and heading from any of said airports or stations to any other airport or station using their respective latitude and longitude retrieved from said data base;

dead-reckoning the location of the aircraft as needed by retrieving from said data base the names and sets of coordinates of any two VOR stations detected by an aircraft VOR receiver, computing the distance and heading between the two VOR stations and computing the distances between the aircraft and each said two VOR stations in function of the distance and heading between the VOR station and the radial bearing detected by the receiver from each station;

checking the performance of the aircraft along its itinerary by tuning the VOR receiver to the frequency of a VOR station which has radials substantially perpendicular to the aircraft track;

by means of said data processing apparatus, retrieving from said data base the latitudes and longitudes of said VOR station and of the airport of departure or the airport of arrival, computing the distance and heading between said airport and said VOR station in function of said latitudes and longitudes; and computing the distance travelled in function of the current radial bearing detected by the VOR receiver from said VOR station and said distance and heading between said airport and said VOR station.

2. An apparatus for assisting a pilot in the navigation of an aircraft which comprises:

a programmable central processor unit;

a keyboard input unit;

a cathode-ray-tube display output unit;

an auxiliary memory unit;

a data base stored within the auxiliary memory unit which comprises the longitudinal and latitudinal coordinates and names of a plurality of airports located within the general area to be travelled by the aircraft;

the longitduinal and latitudinal coordinates, frequencies and names of a plurality of VOR stations detectable within said area;

a program library comprising:

a routine for indexing and displaying information contained in the data base;

a routine for computing the distance between two points defined by their longitudinal and latitudinal coordinates and a routine for determining the heading from any said points to any other;

a receiver tuned to the transmitting frequency used by an air traffic radar station transmitting radar images to an air traffic control center; and means for displaying said radar images on the cathode-ray-tube unit.

3. The apparatus claimed in 2 wherein said means for displaying comprise means for detecting the aircraft identification code; and means responsive to said means for detecting for identifying the aircraft echo in the radar image displayed on the cathode-ray-tube unit.

* * * * *